June 29, 1965 T. S. BENEDICT 3,192,398

COMPOSITE SEMICONDUCTOR DELAY LINE DEVICE

Filed July 31, 1961

INVENTOR
THEODORE S. BENEDICT
BY [signature]
ATTORNEY

United States Patent Office 3,192,398
Patented June 29, 1965

3,192,398

COMPOSITE SEMICONDUCTOR DELAY LINE DEVICE

Theodore S. Benedict, Fanwood, N.J., assignor to Merck & Co., Inc., Rahway, N.J., a corporation of New Jersey Filed July 31, 1961, Ser. No. 128,090
10 Claims. (Cl. 307—88.5)

This invention relates generally to signal transmitting devices, and more particularly to signal delay lines utilizing semiconductor elements.

It is an object of the present invention to provide a signal transmitting device including a plurality of semiconductor elements each of which is isolated from the remainder of said semiconductor elements.

It is another object of the present invention to provide signal transmitting devices including semiconductor elements which impart a predetermined amount of delay to a signal applied to each of the semiconductor elements.

It is another object of the present invention to provide a signal transmitting device including a plurality of semiconductor elements each of which imparts a different predetermined delay to a signal applied thereto.

A signal transmitting device in accordance with the present invention includes at least two layers of semiconductor material separated by an isolating region. Means is provided for establishing a sweeping field in each layer of the semiconductor material and means is provided for applying a signal to and removing it from said layers of semiconductor material.

In accordance with a more specific aspect of the signal transmitting device of the present invention, there is provided first and second layers of essentially single crystalline semiconductor material; each of said layers is crystallographically interconnected to a third layer of semiconductor material which is adapted to physically and electrically isolate the first and second layers from each other. A source of substantially fixed potential is connected to said first and second layers to establish a sweeping field therein. Input and output electrodes are connected to each of said layers for the purpose of applying a signal thereto and for removing a signal therefrom a predetermined length of time after application.

Additional objects and advantages of the present invention will become apparent from consideration of the following description, taken in conjunction with the accompanying drawings which are presented by way of example only and are not intended as a limitation upon the scope of the present invention as defined in the appended claims, and in which:

Figure 1:
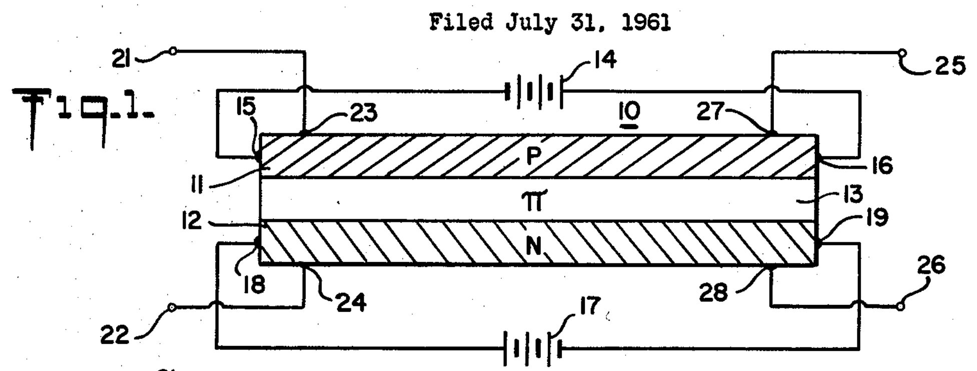
FIG. 1 is a cross-sectional view of a signal transmitting device in accordance with the present invention.

Referring now to the drawing, and more specifically to FIG. 1 thereof, there is disclosed a semiconductor signal transmitting device 10 which includes layers 11 and 12 of semiconductor material. For purposes of example only, the following description of the present invention will be given using silicon as the semiconductor material. It is to be expressly understood, however, that other semiconductor materials such as germanium, germanium-silicon alloy and the group III–V intermetallic compounds such as gallium-arsenide, indium-antimonide and the like may be effectively used as the semiconductor material without departing from the spirit or scope of the present invention.

Preferably the layers 11 and 12 are substantially single crystalline silicon semiconductor material. In the presently preferred embodiment of the present invention, as illustrated in FIG. 1, the layers 11 and 12 are of opposite conductivity type, layer 11 being of P-type and layer 12 of N-type silicon semiconductor material. As will be more fully described below, layers 11 and 12 may be composed of semiconductor material having the same conductivity types but having different conductivities. An isolating region 13 is interposed between the layers 11 and 12 of semiconductor material. Each of the layers 11 and 12 of semiconductor material is affixed permanently to the isolating region 13 so as to provide an integral body or signal transmitting device 10.

In a preferred embodiment of the signal transmitting device of the present invention, the isolating region 13 is preferably a layer of substantially single crystalline silicon semiconductor material having a high resistivity as is indicated by the symbol $\pi$ in FIG. 1. Alternatively, the isolating region may consist of the junction between the P-type and N-type layers appropriately biased to provide a high resistivity region between the layers. In accordance with this preferred embodiment, the P-type layer 11 is physically and electrically isolated from the N-type layer 12 of semiconductor material by the high resistivity layer 13 of silicon semiconductor material and each of the three layers is crystallographically interconnected.

Although it is preferable to construct the isolating region of the same semiconductor material as that of the layers 11 and 12, other material which is capable of electrically and physically isolating the layers 11 and 12 from each other may also be used. The main considerations in determining the material for use in the isolating region, apart from the desired isolation characteristics, are coefficients of thermal expansion and contraction being compatible with the semiconductor materials and that the semiconductor material may be readily affixed to the isolating material.

A source of fixed potential such as battery 14 has the negative terminal thereof connected to one end of the P-type layer 11 by way of ohmic connection 15 while the positive terminal thereof is connected to the other end of the P-type layer 11 by the ohmic connection 16. A second source of fixed potential such as battery 17 has the positive terminal thereof connected to one end of the N-type layer 12 by way of the ohmic connection 18 and the other end thereof connected to the opposite terminal of the N-type layer by way of ohmic connection 19. Input terminals 21 and 22 are connected respectively to layers 11 and 12 by way of ohmic connections 23 and 24 while output terminals 25 and 26 are connected respectively to the layers 11 and 12 by way of ohmic connections 27 and 28.

The battery 14 establishes a sweeping field in the P-type layer 11 of semiconductor material. The source of potential 14 is poled in such a manner that minority carriers which are injected into the P-type layer at the ohmic connection 23 by application of an input signal to terminal 21 are swept by the field through the P-type layer and appear at the output terminal 25 a predetermined period of time later. The battery 17 establishes a similar sweeping field in the N-type layer 12 causing minority carriers to be swept through the N-type layer of semiconductor material in a similar manner.

A typical semiconductor signal transmitting device as illustrated in FIG. 1, by way of example only, could be approximately 1 centimeter in length and approximately 30 mils in thickness, each of the respective layers 11, 12 and 13 being approximately 10 mils in thickness. The resistivity of the P- and N-type layers 11 and 12, respectively, would be approximately 0.5 ohm centimeters, while the resistivity of the layer 13 would be approximately 100 ohm centimeters. By establishing a bias of approximately 100 volts per centimeter, a delay of approximately 3 microseconds is experienced by a signal injected at ohmic connection 23 before it arrives at ohmic connection 27 as shown in FIG. 1. A similar signal, but of opposite polarity, applied at ohmic connection 24 would experience a delay of approximately 6 microseconds before arriving at ohmic connection 28. It can therefore be seen that a signal transmitting device as illustrated in FIG. 1 and above described provides an exceedingly small and compact delay line which provides output signals having been delayed but by different and predetermined amounts. It should become clear that by varying the amount of potential which is utilized to establish the sweeping field in the P- and N-type layers of silicon semiconductor material a variable delay to the signal being transmitted through the device 10 may be accomplished.

A device as illustrated in FIG. 1 may be constructed in any manner desired, but preferably is constructed in accordance with the teachings of patent application Serial No. 53,578, filed August 24, 1960 by John E. Allegretti and James Lago, which is assigned to the assignee of the present application. As is disclosed in the Allegretti et al. application, silicon semiconductor material along with a first predetermined concentration of active impurity atoms is deposited upon a heated essentially single crystalline semiconductor starting element from a decomposable source thereof in a reaction chamber. After a predetermined period of time during which the desired thickness of semiconductor material has been deposited, for example, the layer 11 of P-type material as illustrated in FIG. 1, the reaction chamber is flushed with gas to remove unwanted atoms of active impurity material therefrom. Thereafter, additional semiconductor decomposable source material having a second predetermined concentration of active impurity material of the desired type is introduced into the reaction chamber and an additional layer of desired thickness of semiconductor of silicon material is deposited in essentially single crystalline form contiguous with the layer of material previously deposited. For example, the high resistivity layer 13 may be deposited upon the surface of the layer 11 of P-type semiconductor material previously deposited. Not only will the layers 11 and 12 be contiguous, but will be crystallographically interconnected.

After the layer 13 of high resistivity semiconductor material has been deposited upon and crystallographically interconnected with the layer 11 of P-type semiconductor material and to the desired thickness, an additional layer 12 of N-type semiconductor material is then deposited upon the layer of high resistivity material 13 and is crystallographically interconnected thereto.

After the various layers which form the structure, for example as illustrated in FIG. 1, have been deposited from the decomposable source of silicon semiconductor material, the structure is permitted to cool and is then removed from the reaction chamber. At this point the structure may be cut with a diamond saw or similar apparatus to provide a plurality of semiconductor signal transmitting devices of the type as illustrated in FIG. 1. Thereafter, appropriate ohmic connections may be provided in any manner known to the art, such as, for example, by soldering, alloying, pressure bonding and the like, to permit the application of a sweeping field forming potential and input and output electrodes to the integral semiconductor signal transmitting device 10.

Figure 2:
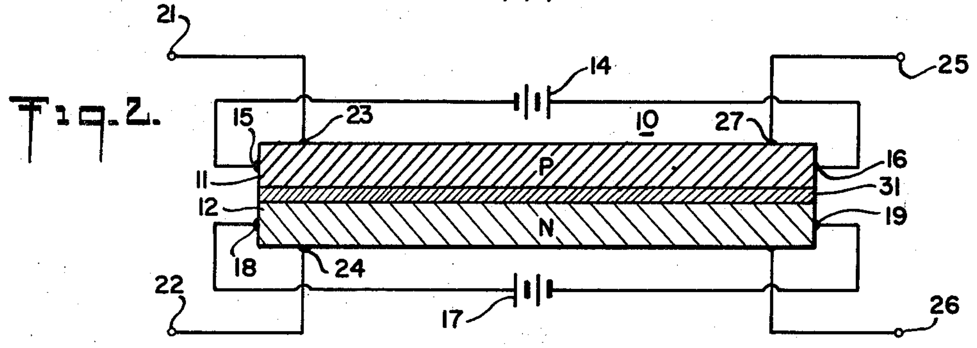
FIGS. 2 and 3 are alternative embodiments of signal transmitting devices in accordance with the present invention.

Referring now more specifically to FIG. 2, there is disclosed an alternative embodiment of a semiconductor signal transmitting device in accordance with the present invention. The various components of the structure as illustrated in FIG. 2 which are similar to those illustrated in FIG. 1 are designated by the same reference numerals. The only difference between the structures of FIG. 1 and FIG. 2 is that the isolating region designated 31 in FIG. 2 is composed of a very low resistivity layer of semiconductor material which has been doped with atoms of gold to reduce the lifetime of minority carriers therein. By having a very low resistivity and low lifetime layer of semiconductor material between the two layers 11 and 12 of semiconductor material, it has been found that each of the layers is as effectively isolated from the other as when utilizing a layer of high resistivity material as above described. In the device as illustrated in FIG. 2, and in accordance with a preferred embodiment thereof, the P-type layer of semiconductor material has a resistivity on the order of 100 ohm centimeters, the N-type layer has a resistivity of the order of 0.5 ohm centimeters, and the isolating region or layer 31 is doped P+ type semiconductor material doped additionally with gold. The remainder of the structure of FIG. 2 is identical to that of FIG. 1 as above referred to.

Figure 3:
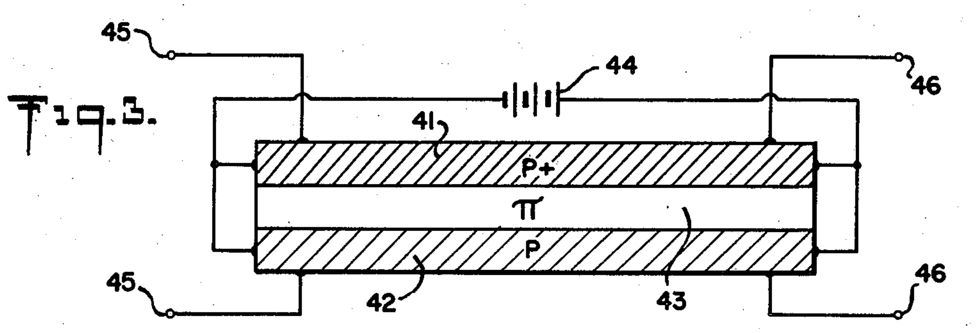

In some embodiments of a signal transmitting device in accordance with the present invention, it is desirable to apply the same signal thereto and to impart a different delay to the signal so that at the output the same signal appears but at different and predetermined times. Such a structure is illustrated in FIG. 3 which includes a first layer 41 and a second layer 42, each of P-type semiconductor material. The layer 41, however, is of much lower resistivity than is the layer 42. Each of the layers 41 and 42 of P-type semiconductor material is isolated from the other by an isolating region 43 which may be as illustrated, a layer of high resistivity semiconductor material. A source of potential 44 is connected to each of the layers 41 and 42 as illustrated, in order to establish a sweeping field therein to cause minority carriers to be swept through the layers 41 and 42 when they are applied to the input terminals 45 thereof. The input terminals 45 may, as above indicated, have the same signal applied thereto, or if desired, may have different signals applied thereto. The output terminals 46 are connected at opposite ends of the layers 41 and 42 of semiconductor material.

Since the layers 41 and 42 are composed of semiconductor material having substantially different conductivities, that is, one being of substantially lower resistivity than the other, the delay imparted to a signal applied to one layer will be substantially different from the delay imparted to the other layer. As is well known in the semiconductor art, the time required for a minority carrier to traverse a predetermined distance with a semiconductor body is controlled not only by the sweeping field, but is also controlled by the mobility of the N- and P-type carriers which are contained within the semiconductor material. The lower the mobility, the greater is the delay which is imparted to the signal.

Figure 4:
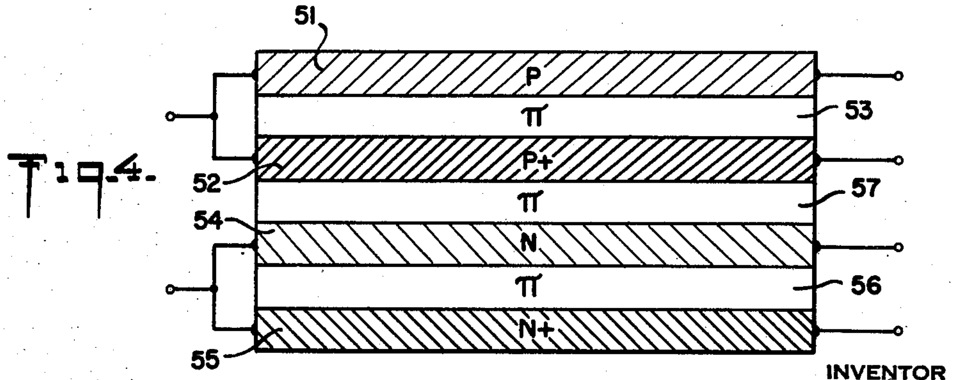
FIG. 4 is a cross-sectional view of a plurality of signal transmitting devices in accordance with the present invention.

Referring now to FIG. 4, there is illustrated a composite delay line which is adapted to provide a plurality of output signals each of which is delayed by a different predetermined amount. The structure of FIG. 4 may be viewed as a P-type delay line having a P conductivity type layer 51 and a P+ conductivity layer 52 separated by a high resistivity layer 53 which operates as the isolating region and in addition an N-type delay line composed of layers 54 and 55 of N-type and N+ type, respectively, isolated by a high resistivity region 56. The P-type and N-type regions are then formed as an integral unit but isolated by isolating region 57 which is also high resistivity type material. Alternatively, of course, the region 57 or any one or all of the isolating regions 53, 56 and 57 may be composed of a very low resistivity low lifetime region of semiconductor material.

The sources of potential for establishing the sweeping fields in the various layers of semiconductor material illustrated in the embodiment of FIG. 4 have been eliminated for purposes of clarity and ease of illustration. It should be understood that means is provided in each instance for applying a bias to the semiconductor elements of the multiple delay line as illustrated in FIG. 3. The operation of each of the layers of semiconductor material is identical to that described above. As is illustrated in FIG. 4, the same signal may be applied to each of the P-type layers and the same signal may be applied to each of the N-type layers, thus providing a plurality of outputs each having a different but predetermined amount of delay depending upon the various parameters established for each of the layers of semiconductor material.

There has thus been disclosed a signal transmitting device including semiconductor elements each of which is isolated from the remainder of the elements and each of which imparts a predetermined amount of delay to a signal which has been applied thereto.

What is claimed is:

1. A semiconductor signal transmitting device comprising: a first layer of essentially single crystalline semiconductor material of one conductivity type; a second layer of essentially single crystalline semiconductor material of the opposite conductivity type, each of such first and second layers being of substantially elongated configuration and having spaced first and second ends in said elongated configuration; an isolating region interposed between said first and second layers of semiconductor material and affixed thereto; means for establishing an electrical field in each of said first and second layers of semiconductor material at the first and second ends thereof; means for injecting a signal into each of said layers of semiconductor material at the first end thereof and means for removing a signal from each of said layers of semiconductor material at the second end thereof a predetermined time after the injection of the signal.

2. A semiconductor signal transmitting device as claimed in claim 1, wherein said isolating region is a layer of essentially single crystalline high resistivity semiconductor material which is crystallographically interconnected to said first and second layers of semiconductor material.

3. A semiconductor signal transmitting device as claimed in claim 1, wherein said isolating region is a layer of essentially single crystalline semiconductor material having low resistivity and low lifetime for minority carriers and which is crystallographically interconnected to said first and second layers of semiconductor material.

4. A semiconductor signal transmitting device as claimed in claim 3, wherein said semiconductor material having one conductivity type is a P-type layer of semiconductor material and said second layer is of N-type semiconductor material, and said isolating region is P+ type semiconductor material which has been doped with gold.

5. semiconductor signal transmitting device comprising: first and second layers of essentially single crystalline semiconductor material of the same conductivity type but having different resistivities, each of said first and second layers being of substantially elongated configuration and having spaced first and second ends in said elongated configuration; an isolating region affixed to but electrically isolating said first and second layers; means for establishing an electrical field in said first and second layers of semiconductor material at the first and second ends thereof; means for injecting a signal into each of said layers of semiconductor material at the first end thereof and means for removing a signal from each of said layers of semiconductor material at the second end thereof a predetermined time after the injection of the signal.

6. A semiconductor signal transmitting device as claimed in claim 5, wherein said isolating region is a layer of high resistivity semiconductor material which is crystallographically interconnected to said first and second layers of semiconductor material.

7. A semiconductor signal transmitting device comprising: a plurality of layers of essentially single crystalline semiconductor material having different conductivities, each of said layers being of substantially elongated configuration and having spaced first and second ends in said elongated configuration; an isolating region interposed between each of said layers of single crystalline semiconductor material and the layer immediately adjacent thereto; means for establishing a sweeping field for minority carriers within each of said layers of semiconductor material at the first and second ends thereof; means for injecting a signal into each of said layers at the first end thereof; and means for removing said signal from each of said layers at the second end thereof a predetermined time after the injection thereof.

8. A semiconductor signal transmitting device as claimed in claim 7, wherein each of said isolating regions is a layer of high resistivity semiconductor material being crystallographically interconnected to adjacent layers of said semiconductor material.

9. A semiconductor signal transmitting device comprising: a unitary body having at least first and second layers of semiconductor material of different conductivities, each of said first and second layers being of substantially elongated configuration and having spaced first and second ends in said elongated configuration; a third layer of semiconductor material affixed to and electrically isolating said first and second layers; means for establishing an electric field in said first and second layers at the first and second ends thereof; means for applying a signal to said first and second layers at the first end thereof; and means for removing said signal from said first and second layers at the second end thereof a predetermined time after the application thereof.

10. A semiconductor signal transmitting device as claimed in claim 9, wherein said third layer of semiconductor material is a high resistivity semiconductor material.

References Cited by the Examiner

UNITED STATES PATENTS

| | | | |
|---|---|---|---|
| 2,932,748 | 4/60 | Johnson | 307—88.5 |
| 2,938,160 | 5/60 | Steele | 307—88.5 |
| 2,941,092 | 6/60 | Harrick | 307—88.5 |
| 2,958,022 | 10/60 | Pell | 317—235 |
| 3,061,739 | 10/62 | Stone | 307—88.5 |

ARTHUR GAUSS, *Primary Examiner.*

JOHN W. HUCKERT, *Examiner.*